Nov. 4, 1952        J. G. TAPPERT ET AL        2,616,337

MACHINE FOR CUTTING NONCIRCULAR GEARS, CAMS, AND THE LIKE

Filed March 30, 1948        4 Sheets-Sheet 1

*INVENTORS,*
JOHN G. TAPPERT
WILLIAM SPERLING.
BY *G. J. Kessenich + J. H. Church*
    ATTORNEYS.

Nov. 4, 1952   J. G. TAPPERT ET AL   2,616,337
MACHINE FOR CUTTING NONCIRCULAR GEARS, CAMS, AND THE LIKE
Filed March 30, 1948   4 Sheets-Sheet 3

Fig. 4A.

INVENTORS,
JOHN G. TAPPERT.
WILLIAM SPERLING.
BY G. J. Kessenich & J. H. Church
ATTORNEYS.

Fig. 4B.

Patented Nov. 4, 1952

2,616,337

UNITED STATES PATENT OFFICE 2,616,337

MACHINE FOR CUTTING NONCIRCULAR GEARS, CAMS, AND THE LIKE

John G. Tappert and William Sperling, Philadelphia, Pa.

Application March 30, 1948, Serial No. 18,047

10 Claims. (Cl. 90—7)

(Granted under the act of March 3, 1883, as amended April 30, 1928; 370 O. G. 757)

The invention described in the foregoing specification and claims may be manufactured and used by or for the Government for governmental purposes, without the payment to us of any royalty thereon.

This invention relates to a machine for cutting non-circular gears, cams and the like.

It is an object of this invention to provide a machine consisting of a standard gear shaper modified to permit a speed of rotation of the work table which may be continually varied in accordance with a predetermined pattern, and also allowing for distance between the center of the cutter and the center of the work table which may be continually varied in accordance with a predetermined pattern.

It is a further object of this invention to provide a machine in which the continually varied speed of rotation of the work table and the continually varied distance between the center of the cutter and the center of the work table are controlled by mechanisms which operate at a large scale factor advantage, thus reducing the accuracy requirements of the controlling machine parts.

It is yet another object of this invention to provide a machine which is capable of attaining the foregoing objects but which nevertheless is capable of use as a standard gear shaper for producing circular gears.

In general, therefore, an object of this invention is to provide a machine for producing non-circular mechanical elements, such as gears or cams, in a simple, economical, and expeditious manner directly from the computed drafts. Employment of this machine will make it possible to produce non-circular gears without the necessity of employing either approximations or the reproduction of a master element such as has been required in the past. In addition, employment of this machine will make it possible directly to generate cams of any shape with a continuous surface that will eliminate the necessity of either filing the surface between the finite number of points or the reproduction of a master element as formerly done. Such a machine may operate either completely automatically or under the manual control of one or more operators.

Machines are available which will duplicate already existing machine parts having non-circular outlines. However, such machines not only reproduce any inaccuracies in the machine part selected as a master, but also introduce further inaccuracies inevitably resulting from the reproducing machine itself. Moreover, some reproducing machines have serious limitations on the curvatures of the machine parts which may be reproduced.

Other objects of this invention and a further and fuller description of some embodiments thereof may be had by reference to the annexed drawings and specification at the end whereof the novel features of the invention will be explicitly pointed out and claimed.

There exists at present a demand for non-circular machine parts such as gears and the like. One method by which the proper shape of the gear pitch line has been generated in the past required laborious calculations which involve approximations and estimates so that the final result is not rigorously exact. As a result of employing this method, pairs of gears have high points and low points on the meshing teeth thereof and consequently must be lapped together to provide smooth running.

In addition, existing means of manufacturing cams require that a master element be cut by a method of "spotting" a finite number of points around the cam surface and filing the intervening edges until a continuous surface is obtained. This method of manufacture requires laborious filing and, unless extreme precautions are exercised, results in a piece that is only approximately correct. Mass production of the required cams is then accomplished by reproduction of the master element which in itself introduces further errors that inevitably result from the reproducing process.

When generating non-circular gears, or any other toothed non-circular element, it is necessary to qualify at every instant the relationship between the rotation of the cutter and the rotation of the work piece. In addition, the center-to-center distance between the cutter and the work piece must also be qualified with respect to the rotation of the work piece. When cutting smooth surfaced non-circular elements such as cams it is necessary to qualify the rotation of the work piece with respect to the center-to-center distance between the work and the cutter; but it is not necessary to qualify the rotation of the work piece with respect to the cutter. Thus, the generation of cams is a simpler process than the generation of non-circular gears and will be dealt with below as a special case under "Method of Operation."

Figure 1:
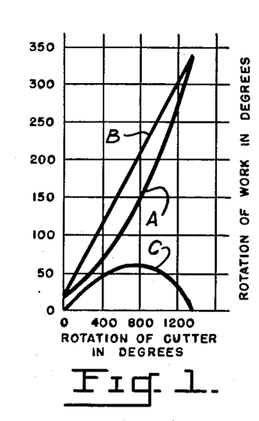
Fig. 1 is a chart or graph useful in describing the invention.
Figure 2:
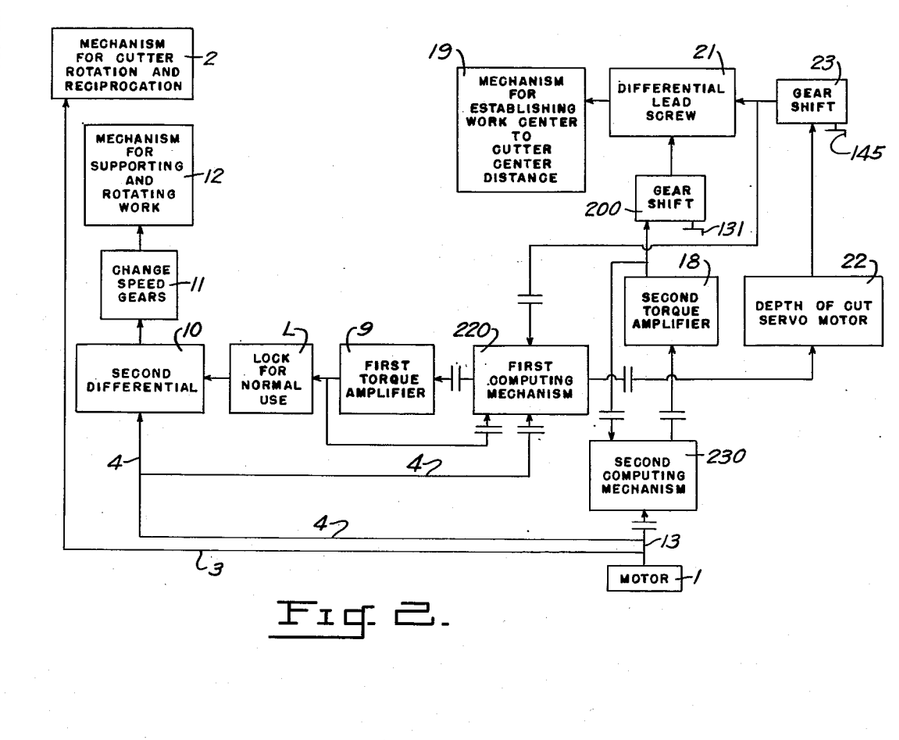
Fig. 2 is a diagram in block form schematically showing our inventive modification of a standard circular gear shaper which enables it to be used for cutting non-circular gears, cams, etc.

For use with the machine of this invention variations of the rotation of the non-circular gear being generated, and also the distance between the center of the gear and the center of the cutter may be computed at a number of points on the gear. These functions may then be plotted as a function of rotation of the cutter which is rotating at essentially a constant speed. Fig. 1 shows such a curve or graph for one type of gear. The curve A represents the rotation of the work table carrying the work piece being cut, this rotation being plotted as a function of the cutter angle. Curve A can be secured as the resultant of the straight line component B (which can be supplied directly from a constant speed motor), and a non-linear component C which is supplied by first computing mechanism 220 (as shown in Fig. 2). This arrangement results in a smaller excursion of the non-linear function than would be required if the entire curve A were obtained from the computing mechanism. This permits a high scale factor which results in greater accuracy. While the curves shown on Fig. 1 illustrate the typical relationship between table rotation and cutter rotation for one particular type of gear they are fairly representative of the relationships that exist for the generation of all non-circular gears.

For many non-circular gears there exists a relationship between the distance between the center of the work rotation and the center of the cutter rotation that, if plotted against cutter rotation, gives a non-linear curve that is either predominantly increasing or decreasing (depending on the direction of cut). When this is true the function resembles that plotted as curve A in Fig. 1 and may be broken down into a straight line and a non-linear function as was the table rotation relationship. In this case the non-linear component is supplied by second computing mechanism 230 (as shown in Fig. 2) with an increase in accuracy as was realized for the table rotation. It should be noted, however, that when the generated gear is reentrant (i. e. with teeth around the entire gear so that the gear can operate any number of turns) the cutter will end the cut at the same position that the cut was started. In this case the motion is neither predominantly increasing or decreasing, which means that the linear component is zero and that the entire movement is non-linear and must be computed by second computing mechanism 230.

Fig. 2 schematically shows a conventional circular gear shaping machine as modified by our invention for cutting non-circular gears. This machine consists of the main or primary motor 1 which, by means of connection 4, drives the first computing mechanism 220. Motor 1, through connection 3, also drives cutter rotation and reciprocation mechanism 2 so that the cutter rotation is proportional to the rotation of the main motor, which is operating at essentially constant speed. As the input of first computing mechanism 220 is also proportional to the rotation of motor 1, the input rotation of this mechanism is directly proportional to the rotation of the cutter. First computing mechanism 220 is designed so that with an input rotation proportional to the rotation of the cutter the output rotation is proportional to the non-linear component of table rotation as represented by curve C in Fig. 1. As the internal mechanism of first computing mechanism 220 is of necessity high grade instrumentation, it is not capable of exerting sufficient torque to operate the heavy machine parts of the gear shaper. For this reason the output torque of the computing mechanism must be amplified by first torque amplifier 9. The output of torque amplifier 9 is fed back to the input side of mechanism 220. In addition the output of torque amplifier 9 is fed to one gear of the second differential 10, the other input of which is directly driven from motor 1 by a part of linkage 4 and whose rotation is therefore directly proportional to rotation of the cutter. By a proper selection of gear ratios throughout the mechanism this rotation may be made to represent the linear component of table rotation as shown on curve B of Fig. 1. The algebraic sum of the inputs to second differential 10 is therefore, at every instant, proportional to the correct table rotation that is required for generating the gear as shown on curve A of Fig. 1, and is fed through the change speed gears 11 and through suitable rotating mechanism to work table 12.

Motor 1 drives, by means of connection 13, a second computing mechanism 230. The function of this computing mechanism is quite similar to the function of first computing mechanism 220 in that the input rotation is directly proportional to cutter rotation and the output rotation is the specified non-linear rotation that is required for generating a particular gear. While first computing mechanism 220 provides the table rotation function, the output of second computing mechanism 230 controls the center-to-center distance between the cutter and the work piece. In the case of a gear in which this function is predominantly increasing or decreasing, and therefore contains a straight line component, the addition of the linear and non-linear components is made inside of the computing mechanism. The output of second computing mechanism 230 is therefore proportional to the total instantaneous center-to-center distance between the work and the cutter. The output torque of second computing mechanism 230 must be amplified and is fed into second torque amplifier 18. The output of torque amplifier 18 is fed back to the second computing mechanism 230. In addition the output of second torque amplifier 18 is fed through a gear shift 200 to a nut 137 (see Fig. 4A) which when rotated on differential lead screw 21 changes the center-to-center distance between the work and the cutter. Depth of cut servo motor 22 is also connected to differential lead screw 21. It is connected in such a manner that operation of the shervo will cause the lead screw to translate, thus changing the center-to-center distance between the cutter and the work even though second torque amplifier 18 is inoperative. Servo motor 22 is controlled by first computing mechanism 220. At the end of a rough cut on the work, computing mechanism 220 will control servo motor 22 in such a manner that the cutter will be moved in towards the depth of the finish cut. Because of the geometry of the problem, this movement will influence the relationship between the rotation of the cutter and the rotation of the work. Consequently the output of servo 22 must be fed back into first computing mechanism 220.

The table rotation and center-to-center distance functions that are supplied by the computing mechanism must be changed for each type of gear that is generated. For this reason, when it is desired to operate under fully automatic control, especially designed computers whose outputs are the correct non-linear functions must be built for every type of gear that is to be cut. In consequence first and second computing mechanisms 220 and 230 are not permanent parts of the modified machine. These computing mechanisms are removable, being connected to the permanent parts by couplings as will later be made clear.

Figure 3:
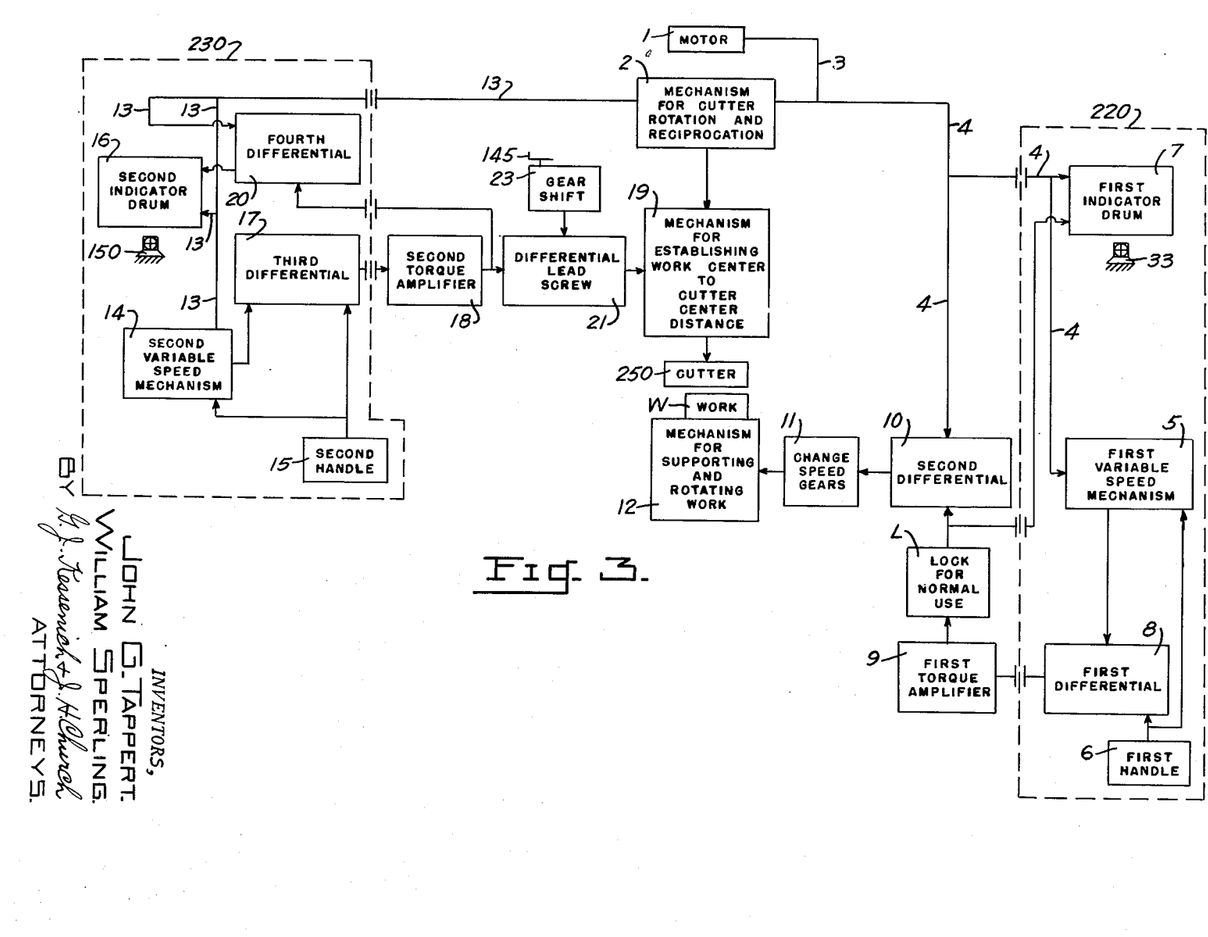
Fig. 3 is a block diagram showing in schematic form the parts of the Fig. 2 machine when equipped with a manual type computing mechanism.

In some cases, the small number of parts to be generated do not justify the construction of special computing mechanisms that are required for fully automatic operations. In such cases, provision is made for economically cutting a few gears of one type by the provision of the so-called manual type computer. The advantage in employing this type of mechanism lies in the fact that by changing a paper chart which is attached to the indicator drum, the computing mechanism may be easily modified to provide any desired non-linear function of cutter rotation. This eliminates the necessity of the extensive machine work that is required to construct a completely automatic computing mechanism. The modified machine equipped with the manual computing mechanisms is shown in Fig. 3. Parts that comprise first computing mechanism 220 (when this mechanism is of the manual type) are first variable speed mechanism 5, first handle 6, first indicator drum 7, first differential 8, and reticle 33. The parts that comprise second computing mechanism 230 (when this mechanism is of the manual type) are second variable speed mechanism 14, second handle 15, second indicator drum 16, third differential 17, fourth differential 20, and reticle 150.

The mechanism shown in Fig. 3 (which is the machine shown in Fig. 2 equipped with the manual type computing mechanism), consists of a main or primary motor 1 which drives a shaft 3 connected to a mechanism 2 (housed in a saddle 2a shown in Fig. 4A) for rotating and reciprocating a cutter 250. A gear train, generally indicated at 4, drives a mechanism 5 which has a varying output speed and which is marked "first variable speed mechanism." This variation in output speed depends upon the operation of a first handle 6 by an operator. Gear train 4 is connected to first indicator drum 7 and rotates the drum at a speed proportional to the cutter speed. Plotted on the drum is a curve which is represented by C in Fig. 1, and which depicts the non-linear portion of table rotation that is to be supplied by the computer. As the drum rotates at a speed proportional to cutter rotation, the cutter rotation coordinate is plotted around the circumference of the drum; the table rotation coordinate being lengthwise along the drum.

The speed of operation of handle 6 is such that fixed reticle 33 is aligned with the curve on indicator drum 7 so that the output position of the first differential 8 at any instant is that indicated by the curve. Since first differential 8 and first variable speed mechanism 5 are necessarily of high-grade instrument gearing, it is preferable that they do not transmit the entire torque necessary to turn the work table. Instead, the output of differential 8 is fed to a first torque amplifier 9 of any known design, either electrical or hydraulic. The output from torque amplifier 9 is fed into the mechanism that translates first indicator drum 7. As the table rotation axis of the mounted curve is lengthwise on the drum, translation of the drum represents a certain amount of table rotation. By regulating first handle 6, the operator may translate the drum and mounted curve until the curve coincides with the cross hairs of reticle 33 which may be mounted in a collimating telescope (not shown).

By so matching the curve the operator introduces the correct function C, shown in Fig. 1, into the table rotation mechanism. The input to second differential 10 from gear train 4 represents the straight line component B of the the required function A shown in Fig. 1. The input to second differential 10 from first torque amplifier 9 represents component C of curve A. The output of second differential 10 is the algebraic sum of the two inputs and is therefore function A shown in Fig. 1, the required table rotation. This output is fed to change speed gears 11 which form part of the gear shaper and thence to the work table 12 on which work piece W undergoing shaping is mounted.

The motor 1 also drives, by means of a connection generally indicated at 13, a second variable speed mechanism 14. Manually operable handle 15 controls the speed of the output part of mechanism 14 which is fed into third differential 17. The output of third differential 17 feeds into second torque amplifier 18 which in turn feeds into both fourth differential 20 and mechanism 19 which controls the distance between the center of the work and the center of the cutter. For many types of gears and cams there exists a relationship between cutter rotation and center-to-center distance that, if plotted, would roughly approximate the shape of the curve shown in Fig. 1. Here again, if the non-linear function is either predominantly increasing or decreasing, the desired function may be represented by a curve similar to A, the straight line component of A by a curve similar to B, and the non-linear component of A may be represented by a curve similar to C.

The gearing that positions the saddle is therefore arranged to function so that it is in effect the same as the table rotation mechanism. The output of second torque amplifier 18 is the desired function of cutter rotation represented by curve A. This quantity is one of the inputs to fourth differential 20. The other input to the differential is gear train 13 which rotates at a speed directly proportional to the speed of the cutter. This rotation may be represented by a curve similar to B. The output of the differential is the algebraic sum of the two inputs and is therefore the non-linear component similar to C which is fed into second indicator drum 16 to translate the attached chart. By controlling second handle 15 the operator may keep the cross hairs of fixed reticle 150 aligned with the plotted curve, thus controlling the center-to-center distance between the cutter 250 and the work W.

When the work piece is reentrant with no net change in the center-to-center distance between cutter and work, after one complete rotation of the work piece there is no linear component of the center-to-center distance function as plotted against cutter rotation. Provision is made for this condition by making gear train 13 detachable from fourth differential 20 and by providing a mechanism that locks the input to fourth differential 20 that is used for the straight line function. When this condition is encountered the entire non-linear function must be plotted on second indicator drum 16 with a resultant loss of scale factor advantage.

Figure 4A:
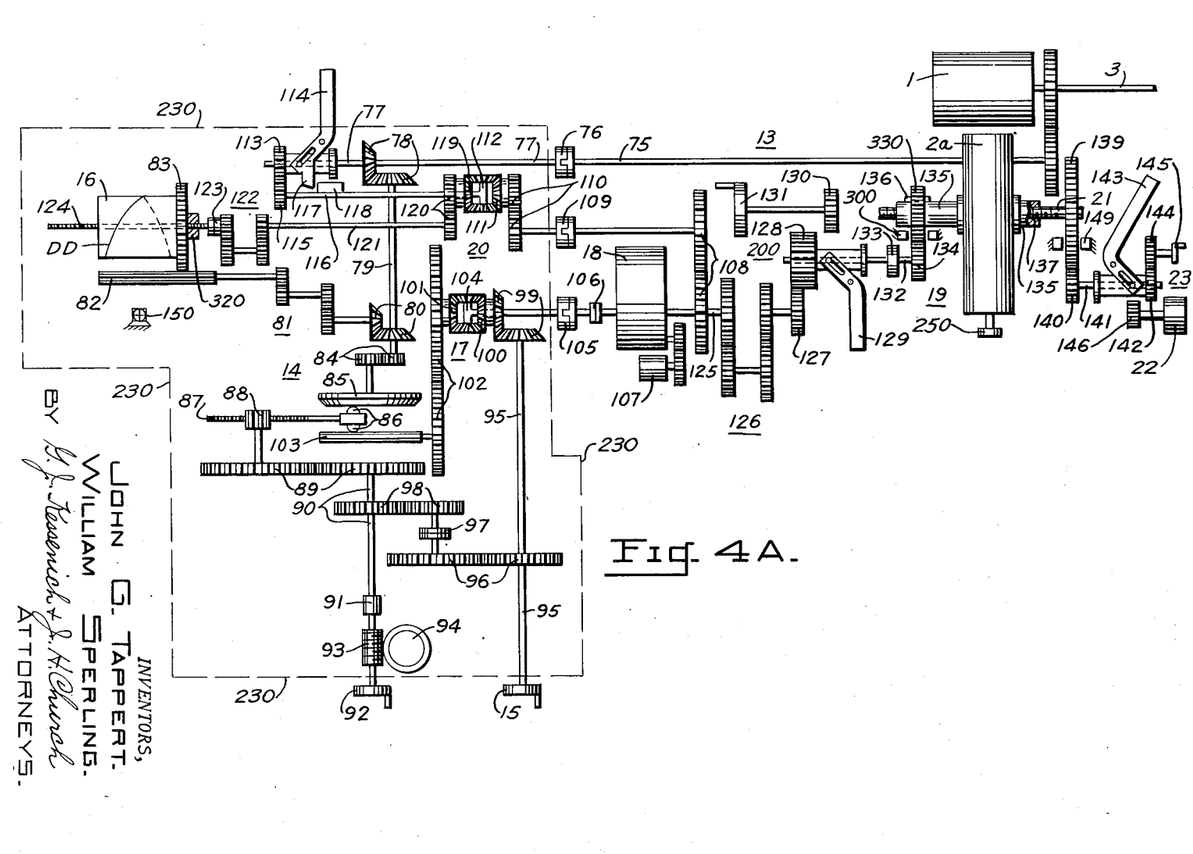
Figs. 4A and 4B are the two halves of a schematic or diagrammatic representation of our inventive machine when provided with the manual type computer as shown in Fig. 3.
Figure 4B:
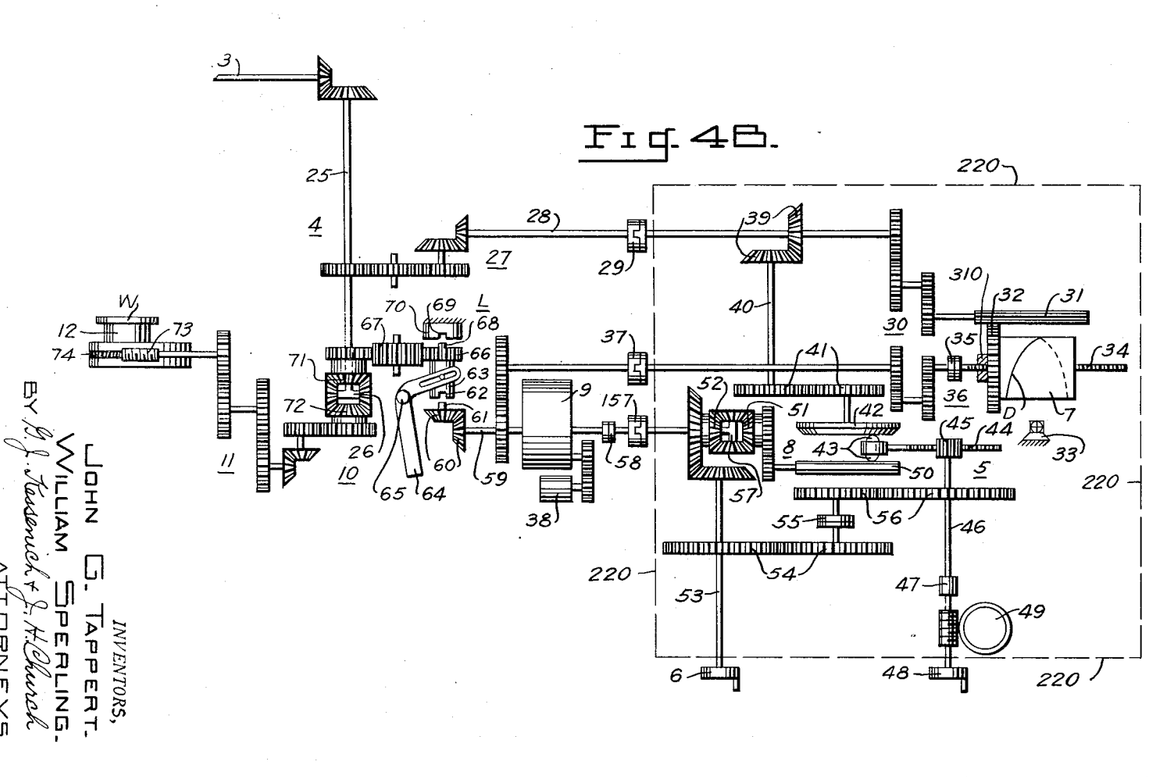

Figs. 4A and 4B show in greater detail the parts of the machine when set up for manual operation. (This is the same condition that is shown on Fig. 3 in block diagram form.) The mechanism shown inside the dotted lines, generally indicated by 220 and 230 are the removable computers. In the illustrations, manual computers are shown. All mechanisms outside the dotted lines are permanent parts of the machine and are used with any computing mechanisms. Fig. 4B shows a table rotation drive. Under manual operation the depth of cut servo 22 is not used as the operation is not automatic. The operation of the table rotation drive is described below.

Primary or main motor 1 drives, by means of a shaft 3 and a second shaft 25, which is a part of the gear train generally indicated at 4, a spider 26 forming a part of second differential generally indicated at 10. The spider 26 is part of the input to differential 10. Shaft 25 also drives a chain of spur and bevel gears (generally indicated at 27) connected to a shaft 28 and a coupling 29, and a second chain of gears generally indicated at 30 which lead to an elongated gear 31, meshing with a gear 32 having a screw threaded nut 310 mounted integrally therewith. Gear 32 is connected to first indicator drum 7 on which a chart bearing curve D may be mounted. While the work is being cut the first indicator drum 7 will be driven by the gears 31—32 at a speed of rotation directly proportional to the speed of rotation of the cutter 250. (While the primary purpose of this drive is to rotate the drum, a slight translation will be caused by the mechanical arrangement of having the nut 310 integral with the rotating drum. This must be compensated for when the curve is being plotted.) As the drum is being rotated at a speed proportional to the cutter, the cutter rotation axis of curve C shown on Fig. 1 is plotted around the circumference of the drum. As the work progresses the drum rotates at essentially a constant speed. The operator observing the chart D through the fixed reticle 33 will see the curve appear to leave the center of the reticle cross hairs. To make the curve return to the center of the reticle, the operator must translate the drum, which is accomplished by turning first handle 6 mounted on shaft 53. Shaft 53 is connected (by means of gears 54, slip clutch 55 and gears 56) with shaft 46 and pinion 45 thereon. A stop 47 limits the rotation of shaft 46 to two revolutions thereby protecting first variable speed mechanism 5 from injury that might result from excessive motion. An adjustment knob 48 and gearing for a dial 49 (for showing the output speed of variable speed mechanism 5) are connected to shaft 46. The variable speed mechanism 5 has a pair of balls 43 connected by means of rack 44, so as to be adjustable from one rim of the input disk 42 through its center of rotation to the opposite rim. Pinion 45 meshes with rack 44 so that the operator, by turning first handle 6 may move the balls radially along the face of disk 42 from one extreme limit to the other. Disk 42 is connected through spur gears 41, shaft 40, bevel gears 39, coupling 29, shaft 28, gearing 27, and shaft 25 to motor 1. The input disk 42 therefore rotates at what is essentially a constant speed. By moving the balls 43 across the face of the input disk 42 it is possible to vary the speed of output roller 50 from the extreme speed in one direction through zero to the extreme speed in the opposite direction.

The output of variable speed mechanism 5 is fed into input gear 51 of first differential 8. The output of first handle 6 is fed directly into input gear 52 of first differential 8. The rotative output of first differential 8's spider 57 is the sum of the movements of the two inputs. This arrangement, whereby an operator turning first handle 6 has direct control of both the speed and position of the output of first differential 8 (and therefore the speed and position of first indicator drum 7), permits easier matching of the plotted curve D by the reticle 33. This rotation is fed through coupling 157 to self-synchronous torque limiting device 58. This self-synchronous torque limiting device 58, along with self-synchronous torque limiting devices 35, 106 and 123, operates so as to slip if the torque on the driven member exceeds a certain specified amount. If the torque is excessive for only a short period, that is, if the driving member has made only a fraction of a turn, the torque limiting device will return to synchronism after the torque has returned to normal. The output of the torque limiting device 58 feeds directly into the input of torque amplifier 9. The power input to torque amplifier 9 is driven by power motor 38. The output of the torque amplifier feeds through gears to coupling 37, a set of gears 36, self-synchronous torque limiting device 35, to lead screw 34 on which is mounted the internal nut 310 which is integral with drum 7. Thus, as the lead screw 34 rotates, the drum will translate the curve D under the reticle 33. This translation is essentially the non-linear component of the work table rotation represented by curve C of Fig. 1.

In addition to feeding back into the computer, the output of torque amplifier 9 is fed through shaft 59 to bevel gears 60. The output bevel gear 60 has, on its upper surface, a diametral bar 61 adapted for cooperation with a confronting notch 62 in a gear shift member 63, which is operated by means of a handle 64 pivoted at 65. Gear shift 63 has connected to it a pinion 66 meshing with a pinion 67 and having on its upper surface a diametral bar 68 arranged for movement into and out of a confronting notch 69 in a stationary stop 70. These parts form a lock L which is required when cams and circular gears are being cut and first computing mechanism 220 is not connected to the gear train for rotating the work W. If this lock were not provided movement of the input spider 26 of second differential 10 would feed out through input gear 71 instead of through the output gear train that rotates the work. Pinion 67 meshes with a part of input gear 71 which forms a portion of differential 10 of which the spider 26 forms another input part. Gear 72 of differential 10 is the output portion of this differential and is connected through the change speed gearing (generally indicated at 11) to a worm gear 73 which meshes with a worm wheel 74 connected to the work table 12 on which the work piece W to be cut is mounted.

Fig. 4A shows the drive for controlling the center-to-center distance between the work and the cutter. Motor 1 drives mechanism 2 (not illustrated in detail) which serves both to rotate cutter 250 in a horizontal plane, and at the same time to reciprocate it vertically so that cutter 250 makes a vertical cutting stroke and a return stroke and thus generates teeth by cutting away a portion of the edge of the work piece W.

Shaft 75 connects at its end with coupling 76, the opposite side of which is connected to shaft 77 which drives bevel gears 78, shaft 79, bevel gears 80, and spur gears 81, connected to an elongated gear 82, which meshes with a gear 83 having a screw threaded nut 320 mounted integrally therewith. Second indicator drum 16 is connected to gear 83. A chart bearing a curve DD which represents the non-linear component in the distance between the center of the work piece W and the center of the cutter 250 may be mounted on drum 16.

Motor 1 drives, by means of shaft 75, coupling 76, shaft 77, bevel gears 78, shaft 79, and spur gears 84, the input disk 85 of the second variable speed mechanism, generally indicated at 14. The mechanism 14 has an intermediate member formed of a pair of balls 86 mounted in a cage connected to a rack 87 with which meshes a pinion 88 driven by means of gears 89 from a shaft 90 having on it a stop 91 which limits the rotation of shaft 90 so that second variable speed mechanism is not damaged by running the balls off of disk 85. Shaft 90 has an adjustment handle 92 on one end of it and is geared by worm 93 to a dial 94 which indicates the output speed of mechanism 14.

Second handle 15 is mounted on shaft 95 which is connected by means of gears 96, slip clutch 97, and gears 98 with shaft 90. Shaft 95 is also connected to a pair of bevel gears 99, one of which forms part of the input gear 100 of the third differential generally indicated at 17 and having a second input gear 101 connected by means of a pair of spur gears 102 with the output roller 103 of variable speed mechanism 14. Third differential 17 serves the same purpose as does first differential 8 in that it increases the accuracy with which the tracker can follow the curve with the reticle mark. The spider 104 of differential 17 is connected by means of coupling 105 and the self-synchronous torque limiting device 106 with the input to second torque amplifier 18 having an additional source of power such as the motor 107. The output of torque amplifier 18 is fed through a pair of gears 108, a coupling 109, and a pair of spur gears 110 to an input gear 111 of the fourth differential generally indicated at 20, the other input part of which is the spider 112. The spider 112 is driven from shaft 77 by means of a pair of spur gears 113 and 115 and a shaft 116 connected to the said spider 112. The output gear 119 of the differential generally indicated at 20 is connected by spur gears 120, shaft 121, spur gears 122, and a self-synchronous torque limiting device 123, with a lead screw 124 whose threads engage with the threads in nut 320 which is integral with gear 83.

Although the mechanical details are slightly different, the operation of this gear train is identical with that of the table rotation computer. The rotation of the drum represents the cutter rotation axis of a curve somewhat similar to that shown on Fig. 1. Translation of the drum represents the non-linear component of the center-to-center distance which is a function of cutter rotation. By translating the drum, using second handle 15 and associated equipment until the curve appears to coincide with the reticle represented by 150, the operator controls the computer so that the output of second torque amplifier 18 drives the cutter to the correct center-to-center distance.

Shaft 77 has slidably mounted on it a gear 113 which is movable by handle 114 out of mesh with gear 115 on shaft 116. Simultaneously handle 114 moves a projection 117 into engagement with a slot 118 on shaft 116 and thereby locks shaft 116 against rotation. When the gear being cut is reentrant, and thus the function of the center-to-center distance between the work and the cutter has no linear component, spur gear 115 is thus removed from mesh with gear 113. When this is done the linear input to differential 20 must be locked. This is accomplished by moving projection 117 into engagement with slot 118. The output from second torque amplifier 18 is carried by shaft 125 through change speed gears indicated at 126 to gear 127. Gear 128 is movable by means of a pivotably mounted handle 129 into and out of engagement with gear 127 or gear 130. When cutting circular gears the drive that is continuously changing the center-to-center distance between the cutter and the work is not required, and gear 130 may be manually rotated by means of handle 131 until the correct center-to-center distance for the particular circular gear being cut is reached. The amount that the operator changes the center-to-center distance may be determined by reading the graduations on micrometer 133. Gear 128 is fastened against rotation on shaft 132 which, in turn, drives a pair of spur gears 134 and 330. Spur gear 330 is mounted on tube 135 and secured thereto by means of an elongated key 136 so that, as the gear is driven, the tube likewise is driven. Tube 135 has as a part of it a screw threaded nut 137 which engages with the threads on differential lead screw 21. As nut 137 is attached to the saddle 2a that carries cutter 250, rotation of tube 135 (and therefore nut 137) will cause the saddle 2a (and therefore cutter 250) to translate in and out along the lead screw. Differential lead screw 21 is also threadably attached into gear 139. The mechanism is so arranged that as gear 139 rotates differential lead screw 21 translates carrying with it nut 137 (and therefore saddle 2a) thereby changing the center-to-center distance between cutter 250 and work W. Stop 149, while allowing gear 139 to rotate, prevents gear 139 from translating with the lead screw, thus preserving the mesh between gear 139 and gear 140 on shaft 141. A stop 300 is provided, its function being to preserve the mesh between the two spur gears 134 and 330, despite the fact that gear 330 is mounted on tube 135 which translates as the spur gears rotate. The drive between gear 330 and tube 135 is accomplished by means of elongated key 136.

Gear 142 is slidably mounted on shaft 141 and is movable therealong by means of a pivotally mounted handle 143. Gear 142 may be meshed with gear 144 and rotated manually by handle 145 or may be meshed with gear 146 and rotated mechanically by means of servomotor 22, which adjusts the distance between cutter 250 and the work W between rough and finish cuts, when operating under fully automatic control. When operating with the manual computer, as shown in Fig. 4A, servo motor 22 is not used and adjustment between cuts is made by use of handle 145.

Referring now to Fig. 4B, couplings 29, 37 and 151 permit the mechanism enclosed within the dotted lines and constituting the first computing mechanism 220 and its associated handle 6 and first indicator drum 7 to be removed as a unit from the machine and replaced with another computing mechanism that may be of the completely automatic type specifically designed for generating a particular gear.

Likewise, couplings 76, 109 and 105 (in Fig. 4A) allow the mechanism enclosed within the dotted lines 230 and constituting the second computing mechanism 230, its associated handle 15, and second indicator drum 16 to be removed from the machine as a unit, and to be replaced by another computing mechanism that may be of the completely automatic type whose output varies in accordance with the output of the mechanism designed for controlling the work table rotation.

METHOD OF OPERATION

Cutting circular gears as heretofore

When it is desired to operate our improved machine to cut circular gears in a manner heretofore known, the operation is as follows. One member of couplings 29, 37, 157, 76, 105 and 109 are pushed back to disengage member mating therewith, thus disconnecting the computing mechanisms from the permanent parts of the machine. Handle 129 is operated so that gear 128 meshes with gear 130 thereby allowing handle 131 to adjust the distance between the center of the work W and the center of the cutter 250. Moving handle 129 so as to mesh spur gear 128 with spur gear 130 will also activate an electrical switch (not shown) that will turn off servo motor 107. Handle 143 is moved so that the spur gear 144 disengages from spur gear 142. This permits the operator to make a fine adjustment on depth of cut between rough and finished cuts on the work by turning handle 145.

Handle 64 is operated about pivot 65 causing notch 62 to leave engagement with diametral bar 61 on bevel gears 60, thus breaking the gear train between the torque amplifier 9 and second differential 10. This movement simultaneously shifts diametral bar 68 into notch 69 in stationary member 70. This engagement locks one input to second differential 10 so that motor 1 drives shafts 3 and 25, spider 26, differential output gears 72, change speed gears 11 and worm 73 which rotates worm wheel 74 connected to table 12 rotating work piece W. In addition, movement of handle 64 activates an electrical switch (not shown) that shuts off torque amplifier motor 38. From this point on, operation of our improved machine is the same as that of a conventional machine prior to modification by our invention.

Novel method of automatically cutting non-circular gears

Referring to Fig. 2, the first computing mechanism 220 and second computing mechanism 230 are set in place. It is assumed that the two special computing mechanisms have been designed, manufactured, and adjusted so that their internal mechanisms are in synchronism and in position for cutting a predetermined portion of the work, such as one end of the gear being cut. The input to first computing mechanism 220 that is driven by the output of depth of cut servo motor 22, as transmitted through gear shift 23, is also set at a predetermined position. The correct change speed gears 11 that are required for operation with first computing mechanism 220 are set in place. The work piece W is rotated manually until the predetermined radius vector lies along the line joining the center of the cutter 250 with the center of rotation of the work W. The hand crank indicated as part of gear shift 23 is rotated until the depth of cut mechanism is set at the predetermined value. The hand crank indicated as part of gear shift 200 is rotated until the center-to-center distance between the cutter and the work is set at the predetermined amount.

Referring now to Fig. 4A, lever 129 is rotated about the pivot point until spur gear 128 engages with spur gear 127, thus completing the gear train between second torque amplifier 18 and differential lead screw 21. Moving this lever also activates an electrical circuit so that when power is applied to the main motor 1 servomotor 107 is also energized. Next, couplings 76, 105 and 109 are engaged. One member of each coupling is adjustable so that the engagement may be made without disturbing the settings of the computing mechanism 230 or the cutter position.

Referring now to Fig. 4B, lever 64 is turned about pivot 65 to shift spur gear 66. This shift causes diametral bar 68 to leave notch 69 and notch 62 to engage diametral bar 61. This forms a continuous gear train between first torque amplifier 9 and second differential 10. The movement of lever 64 also activates an electrical circuit so that when power is applied to main motor 1 servomotor 38 is energized. Next, couplings 29, 37 and 157 are engaged. (In addition, first computing mechanism 220 is coupled to gear shift 23 by a gear train that is not shown on Fig. 4B but is indicated on Fig. 2). One member of each coupling is adjustable so that engagement may be made without disturbing the settings of any mechanism.

The machine is then set into operation. At the start of operation an electrical system (not shown) which is a part of first computing mechanism 220 activates depth of cut servomotor 22 to translate the cutter into position for the rough cut. Starting the machine also energizes main motor 1 and servomotors 38 and 107.

Motor 1 rotates shaft 3 and causes the actuation of mechanism 2 which rotates a reciprocating cutter 250 at essentially a constant speed. Motor 1 also rotates the linkage designated at 4 which causes direct rotation of one input part of second differential 10 and causes rotation of a second input part of second differential 10 through first computing mechanism 220 and first torque amplifier 9. In addition to rotating shaft 3, motor 1 also rotates the connection generally indicated at 13. This causes rotation of the input to second computing mechanism 230 and consequent variable output from second torque amplifier 18. This variable output of second torque amplifier 18 is fed through gear shift 200 and differential lead screw 21 to the mechanism 19 which controls the distance between the center of cutter 250 and the center of work piece W. Thus, the distance is caused to vary in accordance with the variation required to cut a gear of the desired shape. The output of second torque amplifier 18 is also fed back to an input to second computing mechanism 230 and is used as part of the computation.

Cutting progresses at the depth of the rough cut until the work has made slightly more than one revolution from the point where cutting started. At this point a switch (not shown) in first computing mechanism 220 is automatically closed, again activating depth of cut servomotor 22. The servomotor drives until the cutter is at the correct position for a finished cut. The servomotor is then shut off.

After approximately two turns at finish depth of cut, the machine is shut off by another switch (not shown) in first computing mechanism 220. The cutter 250 is simultaneously translated by the depth of cut servomotor 22 to the initial position where it clears the work. At the end of a cut a bell (not shown) rings to call the attention of the operator to the fact that the work is completed. The finished part is removed, a new blank is put into position, and the cycle is repeated.

*Novel method of manually cutting non-circular gears*

As completely automatic operation, which has been described above, necessitates the construction of two expensive and highly specialized computing mechanisms, provision is made for cutting non-circular gears economically when only a few gears of one type are required. This is accomplished by the use of the so-called manual type computing mechanism. The machine is designed so that either type computing mechanism may be used, (i. e. either manual or automatic).

When using the manual type computing mechanism, the required function may be plotted on paper charts which are then attached to first and second indicator drums 7 and 16, respectively, as shown on Fig. 3. When changing from cutting one type of gear to another, no additional machine work on the computing mechanisms is required. The manual operation which is possible with our machine is described below.

Curves D and DD are plotted in accordance with the computed data for the gears to be cut. The curves are then attached to indicator drums 7 and 16 respectively. Certain gears in computing mechanism 230 are changeable (see Fig. 4A). These gears are spur gears 113 and 115 and the gears generally indicated at 81, 84 and 122. The same is true of computing mechanism 220 shown on Fig. 4B. In this computer the gears generally indicated at 30, 36 and 41 are changeable. After placing curves D and DD on their respective indicator drums, the correct change gears are set into place. The two manual type computing mechanisms are then set in position and attached to the main body of the machine.

Setting up the machine is carried on in a manner similar to that described for automatic operation except that for manual operation depth of cut servo 22 is not used. The work table is rotated and the cutter is translated manually to the starting position: levers 64 and 129 are activated and the couplings engaged. The spur gears, generally indicated by 122 and 81 in Fig. 4A are unmeshed. Turning lead screw 124 by hand translates the indicator drum 16, and turning pinion 82 rotates the drum. By rotating and translating second indicator drum 16 until the starting point on curve DD is brought into coincidence with the reticle 150, computing mechanism 230 is brought into adjustment. The gears are then re-meshed. (Because of the finite number of teeth on the gears it may be necessary to rotate or translate the indicator drum 16 one-half tooth from the adjusted position, but this small error will be imperceptible because of the high scale factors involved.)

The same procedure is followed in adjusting first computing mechanism 220 shown on Fig. 4B. In this computing mechanism spur gears generally indicated by 30 and 36 may be unmeshed for adjustment. As there is no automatic compensation of table rotation for coarse cut, two curves are plotted insted of the single curve indicated at D in Fig. 4B. The curves are plotted in contrasting colors. For a coarse cut, the operator follows one curve, while on the finished cut he follows the other curve. Cutter 250 is brought into position for the start of the coarse cut. The machine is then ready to begin the cutting operation.

Referring now to Fig. 4A, motor 1 is then energized. This motor therefore rotates shaft 3 causing rotation of cutter 250 and simultaneously causing reciprocation of cutter 250, giving it a cutting stroke and a return stroke. Motor 1 causes rotation of shafts 3, 75, 77, bevel gear 78, shaft 79, spur gears 84, and driving disk 85 of second variable speed mechanism 14. The output speed of mechanism 14 depends on the position of the balls 86 with relation to the center of input disk 85. The position of balls 86 in turn depends upon the operation of second handle 15. Rotation of handle 15 turns shaft 95, spur gears 96, slip clutch 97, spur gears 98, shaft 90, spur gears 89 and pinion 88. Rotation of pinion 88 moves a rack 87 and balls 86 controlled thereby relative to the center of input disk 85. Constant speed rotation of input disk 85 is therefore delivered as an output varying under the control of handle 15 to the output roller 103, gears 102, to input gear 101 of third differential 17. The speed of rotation of a manually operated shaft 95 is fed directly through bevel gears 99 to the input gear 100 of third differential 17. The sum of the input speeds of gears 100 and 101 of differential 17 is therefore fed to spider 104 which acts as the output of differential 17. The rotation of spider 104 is fed through coupling 105 and self-synchronous safety device 106 to second torque amplifier 18. The output of torque amplifier 18 is fed from shaft 125, gears 108, coupling 109, and gears 110, to the input gear 111 to fourth differential 20. The speed of motor 1 is fed through shafts 3, 75 and 77, gears 113 and 115 and shaft 116 to the spider 112 of differential 20. The algebraic sum of the inputs to gear 111 and spider 112 drives the output gear 119 of differential 20. The rotation of output gear 119 drives spur gears 120, shaft 121, spur gears 122, self-synchronous torque limiting device 123 and lead screw 124, thus translating the drum 16. Motor 1 drives shafts 3, 75 and 77, bevel gears 78, shaft 79, bevel gears 80, spur gears 81, and elongated gear 82 meshing with gear 83. Rotation of gear 83 causes drum 16 to rotate about lead screw 124 as an axis. Handle 15 is rotated at a sufficient speed to keep the curve DD aligned with the cross hairs of the reticle 150.

As the work of cutting the gear progresses, the main motor 1 will, through a gear train previously described, rotate drum 16 at essentially a constant speed. To the operator viewing chart DD through reticle 150 the curve will appear to leave the center of the reticle. To re-align the chart with the reticle it becomes necessary to translate the drum to the right or left (as the case may be). This the operator does by the correct manipulation of handle 15 and associated mechanisms. The output of second torque amplifier 18 goes from shaft 125 through spur gears 126, 127 and 128 to shaft 132, gear 134 and gear 330. This causes tube 135 to rotate which in turn rotates nut 137.

Rotation of nut 137 relative to lead screw 21 causes it to translate along the lead screw carrying with it saddle 2a and therefore cutter 250. By this means the center-to-center distance between the work W and cutter 250 are adjustable in accordance with the function plotted on curve DD.

Operation of first computing mechanism 220 shown on Fig. 4B is similar to that of second computing mechanism 230 and will not be described in detail. The operator, by manipulating handle 6 and associated mechanisms, translates drum 7 until the curve plotted on chart D (Fig. 4B) coincides with reticle 33. Thus input movement to first torque amplifier 9 is controlled so as to vary in accordance with curve C, the non-linear component of the table rotation, shown in Fig. 1. The output of torque amplifier 9 feeds into second differential 10, where it is added to the linear component of table rotation (curve B of Fig. 1) to give the total rotation function shown on curve A, Fig. 1.

*Novel method of cutting cams*

Cams may be generated by either manual or fully automatic means such as described for the generation of non-circular gears. When generating cams it is not necessary to qualify the relationship between the rotation of the work and the rotation of the cutter as is required when cutting non-circular gears. As a result first computing mechanism 220 is not required for the generation of cams.

As the relationship of the center-to-center distance between the work piece and the cutter must be qualified with respect to the rotation of the cam blank, second computing mechanism 230 is required and its operation, either manual or automatic, is carried on exactly as described for the generation of non-circular gears.

The method of operation for cutting cams is therefore as follows. Computing mechanism 220 is disconnected from the machine by a method previously described. Handle 64 is rotated to disconnect first torque amplifier 9 from second differential 10, simultaneously locking input gear 71 of second differential 10 by engaging diametral bar 68 into confronting notch 69. The correct change speed gears 11 are then set in place. Computing mechanism 230 is set in place and synchronized with the machine in a manner identical with that described for cutting non-circular gears either manually or automatically.

SUMMARY

From the foregoing it will be seen that we have provided a machine consisting of a standard gear shaper modified to permit a speed of rotation of the work table which may be continually varied in accordance with a predetermined pattern, and also allowing for a distance between the center of the cutter and the center of the work table which may be continually varied in accordance with a predetermined pattern; that we have provided a machine in which the continually varied speed of rotation of the work table and the continually varied distance between the center of the cutter and the center of the work table are controlled by mechanisms which operate at a large scale factor advantage, thus reducing the accuracy requirements of the controlling machine parts; that we have provided a machine which is capable of attaining the foregoing objects but which nevertheless is capable of use as a standard gear shaper for producing circular gears; and that our inventive machine is capable of producing non-circular mechanical elements, such as gears or cams, in a simple, economical, and expeditious manner directly from the computed drafts.

To those generally familiar with the art it will be obvious that our invention can be practiced with machines having somewhat different parts arrangements than that herein illustrated and described, without materially departing from the spirit and scope of our improvement. Our invention is therefore extensive in its adaption and is not to be restricted to the specific form here shown by way of illustration.

We claim:

1. A machine for shaping non-circular cams, gears, and the like, comprising: a motor; a table for supporting a work piece undergoing shaping; a first power-transmitting linkage connecting said motor so as to rotate said table and including, a first variable-speed device having an input member driven by said motor, an output member, and a first adjustable connecting member providing a driving connection between said members; a first controller moving said first connecting member so as to vary the output speed of said first linkage in accordance with the outline of the work piece undergoing shaping; a cutter for shaping the work piece; a second power-transmitting linkage connecting said motor to said cutter so as to cause relative movement between the center of the work piece and the center of the cutter and including, a second variable speed device having an input member driven by said motor, an output member, and a second adjustable connecting member providing a driving connection between said members; and a second controller moving said second connecting member so as to vary the output speed of said second linkage in accordance with the outline of the work piece undergoing shaping.

2. In a machine for cutting non-circular gears, cams, or the like, from a flat blank, including a table on which the blank to be cut is mounted, a cutter for shaping the blank, and a motor for driving said table and said cutter, mechanism for varying the distance between the center of the blank being cut and the center of said cutter, said mechanism including, a lead screw adapted to be locked against rotation, a tube enclosing a portion of said lead screw so as to be traversible therealong, a saddle mounted for translatory movement along said lead screw and containing mechanism for rotating and reciprocating said cutter, a nut comprising part of said tube and linked to said saddle while being threadedly mounted on said lead screw so as to be traversible therealong upon rotation of said tube, a gear so mounted on said tube that the gear is keyed against rotary movement relative to said tube but the tube is free for longitudinal movement relative to said gear, and power-transmitting mechanism connecting said motor to said gear so that said gear together with the tube, nut, saddle and cutter linked thereto are driven at a selectively variable rate of speed, whereby the movement of the cutter relative to the blank may likewise be had at a selectively variable rate of speed.

3. In a machine for shaping non-circular cams, gears, and the like, a tool transmission comprising: a motor; a cutter for shaping a work piece; a power-transmitting linkage connecting said motor to said cutter so as to cause relative movement between the center of the cutter and the center of the work piece undergoing shaping and including, a variable speed device having an input member driven by said motor, an output member, and an adjustable connecting member providing a driving connection between said members; and a position controlling mechanism for moving said connecting member so as to vary the output position of said linkage in accordance with the outline of the workpiece undergoing shaping, said mechanism including a drum driven by said motor and adapted to carry on it a curve representing a function to which it is desired to have correspond the amount of movement of said connecting member, and means mechanically linked with said cutter and said drum for controllably adjusting the amount of movement of the cutter relative to the workpiece.

4. In a machine for shaping non-circular cams, gears, and the like, a work table drive comprising: a motor; a table for supporting a work piece undergoing shaping; a power-transmitting linkage connecting said motor so as to rotate said table and including, a variable-speed device having an input member driven by said motor, an output member, and an adjustable connecting member providing a driving connection between said members; and a position controlling mechanism for varying the output position of said linkage in accordance with the outline of the work piece undergoing shaping, said mechanism including a drum driven by said motor and adapted to carry on it a curve representing the function to which it is desired to have correspond the amount of movement to said connecting member, and means mechanically linked with said table and said drum for controllably adjusting the amount of movement of the table relative to the workpiece.

5. In a machine for shaping non-circular cams, gears and the like, a tool transmission comprising: a motor; a cutter for shaping a work piece; a power-transmitting linkage connecting said motor to said cutter so as to cause relative movement between the center of the cutter and the center of the work piece undergoing shaping; and a position controlling mechanism for varying the output position of said linkage in accordance with the outline of the work piece undergoing shaping, said mechanism including a drum driven by said motor and adapted to carry on it a curve representing a function to which it is desired to have correspond the amount of movement of said linkage, and means mechanically linked with said cutter and said drum for controllably adjusting the amount of movement of the cutter relative to the workpiece.

6. In a machine for shaping non-circular cams, gears, and the like, a work table drive comprising: a motor; a table for supporting a work piece undergoing shaping; a power-transmitting linkage connecting said motor to said table so as rotatively to move said table; and a position controlling mechanism for varying the output position of said linkage in accordance with the outline of the work piece undergoing shaping, said mechanism including a drum driven by said motor and adapted to carry on it a curve representing a function to which it is desired to have correspond the amount of movement of said linkage, and means mechanically linked with said table and said drum for controllably adjusting the amount of movement of the table relative to the workpiece.

7. A shaper adapted to cut flat machine parts to non-circular outline, comprising: a motor; a first drum driven by said motor and adapted to carry on it a curve representing the function to which it is desired to have correspond the speed of rotation of the part being cut; a first reticle aligned with the curve on said drum so that an observer can note any variation from the output represented by said curve; a first variable speed mechanism having a first driving member driven by said motor, a first driven member, and a first intermediate member movable to vary the speed with which said first driving member drives said first driven member; first controlling means for adjusting the effective position of said first intermediate member; a feed-back connection from said first driven member to said first drum whereby any variation in the output speed of said first variable speed mechanism appears in the speed of movement of said first drum; a table, on which the machine part being cut is mounted, driven by said first driven member; a second drum driven by said motor and adapted to carry on it a curve representing the function to which it is desired to have correspond the distance between the center of the machine part being cut and the center of said table; a second reticle aligned with the curve on said second drum so that an observer can note any variation from the output speed represented by said curve; a second variable speed mechanism having a second driving member driven by said motor, a second driven member, and a second intermediate member movable to vary the speed with which said second driving member drives said second driven member; second controlling means for adjusting the effective position of said second intermediate member; a second feed-back connection from said second driven member to said second drum whereby any variation in the output speed of said second variable speed mechanism appears in the speed of movement of said second drum; a cutter for shaping the machine part being cut; and mechanism supporting said cutter and connected to said second driven member so as to be driven thereby to vary the distance from the center of the pitch circle being cut on said machine part and the center of said cutter.

8. A shaper adapted to cut flat machine parts to non-circular outline, comprising: a motor; a first drum driven by said motor and adapted to carry on it a curve representing the function to which it is desired to have correspond the speed of rotation of the part being cut; a first reticle aligned with the curve on said drum so that an observer can note any variation from the output represented by said curve; a table, driven by said motor, on which the machine part being cut is mounted; means associated with said table and said first drum whereby any variation in the speed of the table is observed and adjusted for in the speed of movement of said first drum; a second drum driven by said motor and adapted to carry on it a curve representing the function to which it is desired to have correspond the distance between the center of the machine part being cut and the center of said table; a second reticle aligned with the curve on said second drum so that an observer can note any variation from the output speed represented by said curve; a cutter for shaping the machine part being cut; supporting mechanism for said cutter connected to said motor so as to be driven thereby to vary the distance from the center of the pitch circle being cut on said machine part and the center of said cutter; and means associated with said cutter supporting mechanism and said second drum whereby any variation in the speed of cutter support is observed and adjusted for in the speed of movement of said second drum.

9. A shaper adapted to cut flat machine parts to non-circular outline, comprising: a motor; a member driven by said motor for acting on the machine part to be cut; a drum driven by said motor and adapted to carry on it a curve representing the function to which it is desired to have correspond the amount of movement of said member; a reticle aligned with the curve on said drum so that an observer can note any variation from the output represented by said curve; and means mechanically linked with said member and said drum for controllably adjusting the amount of movement of said member relative to said machine part.

10. In a machine for cutting non-circular gears, cams, or the like, from a flat blank, including a table on which the blank to be cut is mounted, a cutter for shaping the blank, and a motor for driving said table and said cutter, mechanism for varying the distance between the center of the blank being cut and the center of said cutter, said mechanism including, a lead screw adapted to be locked against rotation, a nut linked with said cutter and mounted on said lead screw so as to traverse therealong and to cause relative movement between said cutter and said blank by said traversing movement, a gear so mounted on said nut that the gear is keyed against rotary movement relative to said nut but the nut is free for longitudinal movement relative to said gear, and power-transmitting mechanism connecting said motor to said gear so that said gear together with the nut and cutter linked thereto are driven at a selectively variable rate of speed, whereby the movement of the cutter relative to the blank may likewise be had at a selectively variable rate of speed.

JOHN G. TAPPERT.
WILLIAM SPERLING.

REFERENCES CITED

The following references are of record in the file of this patent:

UNITED STATES PATENTS

| Number | Name | Date |
|---|---|---|
| 1,177,503 | Fellows | Mar. 28, 1916 |
| 1,716,115 | Clark et al. | June 4, 1929 |
| 1,933,798 | Gebers | Nov. 7, 1933 |
| 2,116,593 | Bouvier et al. | May 10, 1938 |
| 2,151,743 | Chladek | Mar. 28, 1939 |
| 2,226,677 | Vikhman | Dec. 31, 1940 |
| 2,271,598 | Maurer | Feb. 3, 1942 |
| 2,443,793 | Lensky et al. | June 22, 1948 |

FOREIGN PATENTS

| Number | Country | Date |
|---|---|---|
| 513,715 | Germany | Dec. 1, 1930 |